United States Patent [19]

Darilek

[11] Patent Number: 4,947,470

[45] Date of Patent: Aug. 7, 1990

[54] SYSTEM FOR LOCATING LEAKS IN A GEOMEMBRANE-LINED IMPOUNDMENT OR LANDFILL FILLED WITH MATERIAL

[75] Inventor: Glenn T. Darilek, San Antonio, Tex.

[73] Assignee: Southwest Research Institute, San Antonio, Tex.

[21] Appl. No.: 311,178

[22] Filed: Feb. 14, 1989

[51] Int. Cl.⁵ .............................................. G01N 27/00
[52] U.S. Cl. .................................... 324/557; 73/49.2; 324/326; 324/527; 340/605
[58] Field of Search ............... 324/557, 559, 551, 554, 324/527, 528, 529, 530, 326; 340/604, 605, 606; 73/49.2

[56] References Cited

U.S. PATENT DOCUMENTS

| | | | |
|---|---|---|---|
| 3,383,863 | 5/1968 | Berry | 324/557 X |
| 4,166,244 | 8/1979 | Woods et al. | 340/604 X |
| 4,543,525 | 9/1985 | Boryta et al. | 324/559 |
| 4,719,407 | 1/1988 | Converse et al. | 340/605 X |
| 4,720,669 | 1/1988 | Owen | 340/605 X |
| 4,725,785 | 2/1988 | Converse et al. | 324/559 |
| 4,740,757 | 4/1988 | Converse et al. | 324/559 |
| 4,751,467 | 6/1988 | Cooper | 324/557 |
| 4,751,841 | 6/1988 | Biard et al. | 73/49.2 |
| 4,755,757 | 7/1988 | Cooper | 324/557 |

*Primary Examiner*—Reinhard J. Eisenzopf
*Assistant Examiner*—Robert W. Mueller
*Attorney, Agent, or Firm*—Gunn, Lee & Miller

[57] ABSTRACT

This invention is directed to detecting and locating leaks in geomembrane liners used to contain liquid or liquid-solid materials, such as in waste landfills and liquid impoundments. An array of electric or magnetic field detectors is placed on one side of the liner. The detector array is on a plane generally parallel to the liner, and the location of each detector is known. A voltage is impressed across the liner. When a leak occurs in the liner, a current flows through the leak, creating an electric field and a magnetic field around the leak. The existence of the electric or magnetic field is detected by the detector array, which indicates a leak. The leak is located with orthogonal measurements from selected detectors, and these measurements are used to geometrically locate the leak.

32 Claims, 5 Drawing Sheets

FIG._5

SYSTEM FOR LOCATING LEAKS IN A GEOMEMBRANE-LINED IMPOUNDMENT OR LANDFILL FILLED WITH MATERIAL

FIELD OF THE INVENTION

This invention relates in general to a system for containing liquid or solid-liquid materials, such as in a waste landfill or liquid impoundment, and in particular to a system for locating leaks in geomembrane liners used to contain the material.

RELATED PATENTS

U.S. Pat. Nos. 4,719,407, 4,725,785, 4,720,669, 4,751,841, 4,751,467, 4,755,757, 4,740,757, and Ser. No. 027,848 are all directed to various apparatuses and methods in connection with the use of geomembrane liners, also known as synthetic membrane liners or flexible membrane liners, to contain waste materials. More specifically, the inventions deal with electrical methods for detecting and locating leaks in the geomembrance liners.

BACKGROUND

It is often desirable to have a liquid-proof barrier for containing a large body of liquid or liquid-solid material. For example, waste landfills and liquid impoundments are two types of impoundments in which the fill volume may contain toxic liquids. Some sort of barrier is necessary to prevent leakage that would contaminate the environment.

Geomembrane liners are one type of barrier used for containing such waste materials. These liners are made from large sheets of flexible material such as plastic, which is typically a high-density polyethylene or other polymeric material. In addition to being flexible, the liner material is selected to resist deterioration as a result of contact with the waste.

The liner is constructed to define the bottom and sides of the impoundment and to form an impermeable barrier. Generally, to form the liner, sheets of the material are seamed together at the site to form one or more continuous layers.

Often, to provide an additional margin of containment, the liner is comprised of two separate layers of liner material. The methods described above must then be adapted if leaks in the upper liner are to be detected. An inter-liner zone between the liners has been used with such methods.

A persistent problem with both single layer and double layer liners is their susceptibility to leaks, such as punctures and seam leaks. These leaks can occur as a result of installation and operational factors. When waste materials are contained within the impoundment, such leaks can contaminate the environment if not remedied. Thus, it is necssary to know whether a leak is present, and if so, where the leak is, so that remedial action can be taken.

When a new liner is installed, locating and repairing leaks is relatively simple. Conventional methods include visual inspection, vacuum box testing, mechanical testing, arc discharge testing, and air lance testing. All of these methods require the impoundment to be empty and the liner to be exposed.

If the impoundment is filled with material, the ability to accurately locate a leak is critical to the ability to repair it. In other words, repair is much facilitated if the location of the leak is known. Thus, various methods have been developed to locate leaks in liners after they are in use.

Recently, a electrical current detection method has been developed, which requires an electrically conductive medium, such as water, covering the liner. This method is described in the patents listed in the "Related Patents" section above. Generally, a detector is moved through the impoundment to detect the magnetic or electrical effects of current flowing through a leak. Although this method is useful when the liner contains a relatively homogeneous fluid, its usefulness is limited when the material in the impoundment does not have such characteristics, such as when the impoundment contains solid waste.

If the waste in the impoundment is not a relatively homogenous liquid, two methods for locating leaks are a parallel wire dielectric method and a low resistance measuring method. Both involve placing wires under the liner.

The parallel wire dielectric method involves placing parallel wires under the liner during construction. Leaking liquids penetrate the soil between the wires, thus forming a lossy dielectric. The leak is located using time-domain reflectometry, whereby a portion of an electromagnetic pulse propagated along two adjacent wires is reflected and detected. The location and severity of the leak can be determined from time and amplitude measurements of the reflected pulse.

The low resistance measuring method uses electrical wires arranged in a grid under the liner. The media under the liner separates the grid wires from each other. Leaks are indicated by detecting a decrease in resistance between two or more wires. The leak is located by locating the intersection of the two perpendicular wires having low resistance.

A limitation of both wire methods is that they are affected by fluctuations in the groundwater level. Also, contaminant liquids may remain in the sub-liner media after the leak is repaired, making the method less useful for detecting subsequent leaks. Another disadvantage of the resistance measuring method is that the wires must be bare, so that corrosion and chemical action may destroy the wires.

Another method that could be used for locating leaks in a solid-filled impoundment is disclosed in U.S. Pat. No. 4,725,785. This patent describes use of the electrical current detection method generally described above, but also discusses a method for locating leaks in the lower liner of a two-layer geomembrane liner, where the potential difference in the middle area between the liners is inaccessible to direct measurement. The area between the liners is filled with liquid. A voltage measuring detector rotates near the perimeter of the impoundment and measures potential differences. An anomaly in potential difference indicates a leak and by measuring potential difference as a function of the detector's azimuthal position, the leak can be located.

SUMMARY OF THE INVENTION

This invention provides a method and apparatus for detecting and locating leaks in a landfill or impoundment that is useful regardless of the material in the landfill or impoundment. Thus, the invention is useful for landfills that contain solids, as well as for impoundments that contain only liquids or small particles in liquid.

Another feature of the invention is that it does not require any apparatus to be located in the impounded material, other than a voltage impressing electrode.

Another feature of the invention is that the same apparatus may be used to detect and locate leaks in the top or the bottom liner in a two-layer liner, as well as in a one-layer liner. For a two-layer liner, a switchable current path permits detection of either a leak through the top liner into an inter-liner zone or a leak from the inter-liner zone through the bottom liner.

Another feature of the invention is that its usefulness is not limited to detecting only one leak in a given area of the liner. The invention may be used to detect subsequent leaks after a first leak in the same location has been located and repaired. Measurement detectors sense the electric or magnetic field caused by current flow through an active leak.

Another feature of the invention is that leaks are evidenced by impressing voltage difference across the liner. If the material in the impoundment is conductive and the lower surface of the liner is in contact with an electrical conductor, this voltage difference is impressed by inserting two electrodes, one on each side of the liner.

Another feature of the invention is that there is no need for motion of a measurement detector. An array of measurement detectors remains stationary in a plane generally parallel to the liner. The known location of the detectors permits geometric location of a leak.

Another feature of the invention is that the measurement sensors can be constructed so they measure the effect of a current caused by a leak by measuring either electric field or magnetic field effects of a leak.

Another feature of the invention is that a leak can be located with at least four orthogonal measurements. Additional measurements can be made to improve accuracy.

Another feature of the invention is that it may be operated in two modes. A monitoring mode detects leaks anywhere in the liner. A location mode is used to locate a leak.

BRIEF DESCRIPTION OR THE DRAWINGS

DETAILED DESCRIPTION OF THE INVENTION

A. Systems having two-layer liners and single-electrode detectors

Figure 1:
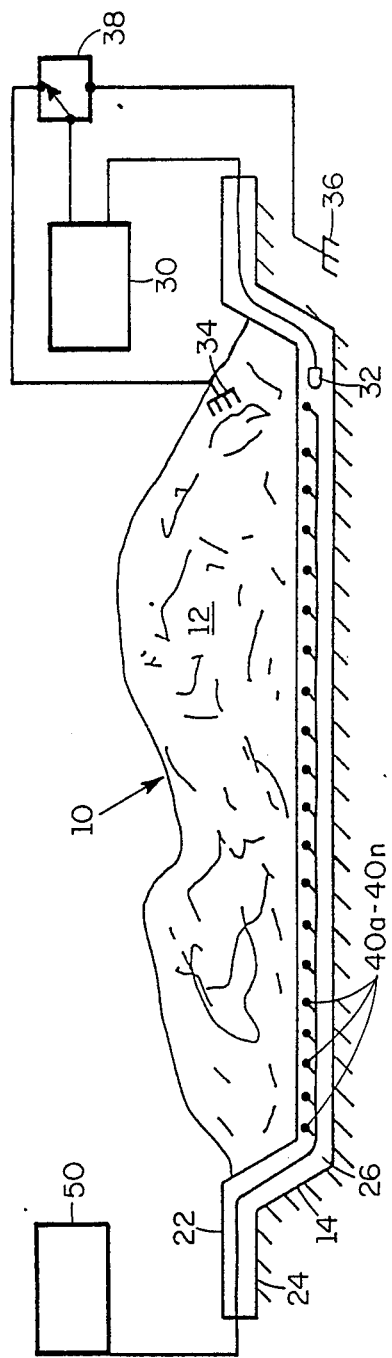
FIG. 1 is a cross sectional view of a landfill, in which the invention has been installed.

FIG. 1 is a cross sectional view of the preferred embodiment of the invention, in which the landfill 10 contains liquid-solid waste 12. The physical makeup of the material contained in landfill 10 is not important to the usefulness of the invention; the material may be liquid, small particles in liquid, or a liquid-solid combination. All that is required is that there be a means for a conductive path from an impressed voltage electrode through a leak, as explained below. Generally, this will not be problem because the material in landfill will contain at least some moisture. Furthermore, liquid may enter the landfill naturally, such as by rain.

As shown in FIG. 1, landfill 10 is a relatively shallow earth formation having sloped sides 14. It may be as large as many acres and its perimeter may be any size or shape desired. Its bottom may be flat or constructed with a slight slope to a sump to collect leachate.

Landfill 10 is defined by a two-layered liner, with a top liner 22 and a bottom liner 24, separated by an inter-liner zone 26. Top liner 22 and bottom liner 24 are made from any material that is electrically resistive, tends to be impermeable to liquid, and does not deteriorate from exposure to the materials that are to be impounded. Liners 22 and 24, need not be identical in composition so long as they have the same desired properties. In the preferred embodiment, liners 22 and 24 are made from impermeable plastics or rubbers, for example 100-mil, high-density polyethylene.

Typically, liners 22 and 24 are contructed with sheets of flexible liner material. These sheets are joined at their seams and placed on the bottom and sides of landfill 10 while landfill 10 is empty.

Landfill 10 is preferably located in a conductive media, which as shown in FIG. 1, will typically be earth. If landfill 10 is not in a conductive media, other means for electrical conduction under landfill 10 may be devised.

For purposes of describing the invention, it is assumed that landfill 10 contains at least some liquid, which may leak through liners 22 and 24. Because it is assumed that the material in landfill 10 will permit a conductive path to a point in liner 22 having a leak, if liners 22 and 24 have no leaks, they act as electrical insulators between the material in landfill 10 and the earth beneath landfill 10.

The area between liners 22 and 24, inter-liner zone 26, is a conductive material, such as water or moist sand. Other materials that may comprise inter-liner zone 26 include leachate, soil, or a water or leachate saturated, non-conductive matrix such as plastic net or geofabric. Ideally, inter-liner zone 26 will be uniformly conductive. In the preferred embodiment, inter-liner zone 26 is electrically isolated from earth or any other conductive medium. The invention is useful, but less accurate for locating leaks, if inter-liner zone 26 is not electrically isolated.

As shown in FIG. 1, the invention includes a means for impressing a voltage across liners 22 and 24. In the preferred embodiment, this means for impressing a voltage is a current source 30, which is located outside landfill 10. A voltage supply may also be used, and both the current and voltage supply may be generally referred to as a power supply.

Current source 30 is electrically connected to three impressed voltage electrodes 32, 34 and 36, being switchable between electrodes 34 and 36. Preferably current source 30 provides alternating current, because as will be seen below, the invention also is comprised of measurement electrodes that could become polarized with direct current, making measurements less accurate. Furthermore, current source 30 preferably provides a low frequency current so that the impressed voltage will not become loaded by the capacitive reactance of liner 22 and liner 24.

Inter-liner electrode 32 is placed in inter-liner zone 26. Ideally, inter-liner electrode 32 is installed in electrical contact with the bulk of the conductive material in interliner zone 26.

Waste immersion electrode 34 is placed in the impounded material in electrical contact with the bulk of conductive material within liner 22. Waste immersion electrode 34 should be both conductive and resistent to corrosion. Carbon or stainless steel is particularly well suited for this purpose. A factor dictating the placement of immersion electrode 34 is that a current path must be available from immersion electrode 34 through liner 22 if a leak occurs. The current in landfill 10 can take any path, depending on the electrical resisance of the material in landfill 10.

Ground electrode 36 is placed in the earth outside landfill 10. An example of ground electrode 36 is a copper-clad steel rod that is driven into the ground near landfill 10. When ground electrode 36 is in circuit, it is desirable to minimize the voltage drop between ground electrode 36 and the earth, which can be accomplished by increasing the surface area of ground electrode 36.

Because the invention requires a current path between electrode 32 and electrode 34 or 36, it may be desirable to have more that one of each type of electrode at various locations. Alternatively, electrodes 32, 34, and 36 may be made moveable.

A switch 38 permits the output of current source 30 to be directed to either waste immersion electrode 34 or ground electrode 36. In FIG. 1, switch 38 is a simple single pole, double throw switch, but any type of mechanical or electrical switch may be used.

Figure 2:
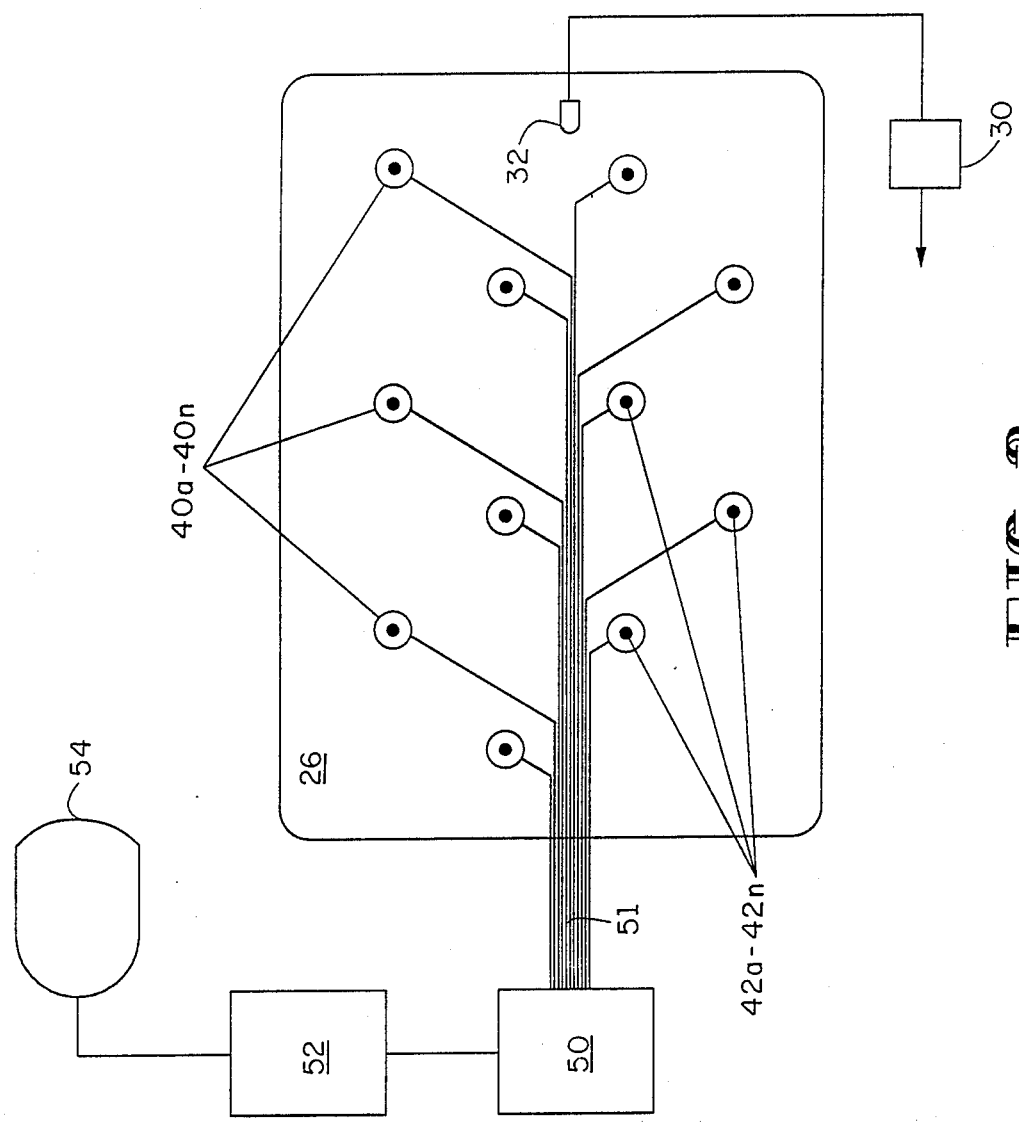
FIG. 2 is a plan view of the inter-liner zone shown in FIG. 1.

As shown in FIG. 2, an array of detectors 40a–40n is located between liner 22 and liner 24 in inter-liner zone 26. Detectors 40a–40n are each in electrical communication with a terminal 50 outside landfill 10. If such electrical communication is by means of conducting material such as wires 51, the wires must be electrically insulated from whatever material comprises inter-liner zone 26.

At terminal 50, measurements from detectors 40a–40n are received and processed. Wires 51 terminate at terminal 50, where each individual wire is labeled as to the location of the detector 40a–40n to which it is connected. In the preferred embodiment, terminal 50 is in communication with data processing means 52 and display means 54, which may be a standard device such as a microcomputer. The measurements and data processing may also be performed manually.

The number of detectors 40a–40n, and thus their spacing, is selected to obtain a predetermined leak detection sensitivity and leak location accuracy. The spacing is dependent on the minimum size of a detectable leak, the resistivity of the material in interliner zone 26, the thickness of inter-liner zone 26, and the sensitivity of the data collection system. In the preferred embodiment, detectors 40a–40n are about 25 feet from each other and are uniformly spaced throughout inter-liner zone 26. Uniform spacing facilitates the calculations used to locate a leak, but leak location is possible without uniform spacing so long as the location of each detector is fixed and known.

Detectors 40a–40n are each comprised of a means for obtaining orthogonal measurements of the strength of the electric field around leak 60. These measurement means are comprised of a single electrode at each detector for measuring voltage, here labeled as electrodes 42a–42n. As compared to an alternative embodiment of the invention, descibed in part B below, which uses multiple electrodes at each detector, this embodiment is designed to minimize the number of electrodes and wires required to locate leaks in a particular landfill.

Thus, although FIG. 2 shows each detector 40a–40n with a single electrode 42a–42n, alternative embodiments of the invention may obtain orthogonal measurements with other configurations of electrodes on detectors 40a–40n. All that is required is that at least two pairs of orthogonal measurements are available and that the location of the detectors is known. As described below, the preferred embodiment uses selected combinations of seven electrodes to obtain these measurements.

When there are no leaks in liners 22 and 24, the liners act as electrical insulators between the impressed voltage resulting from current source 30. The high resistivity of liner 22 inhibits current flow from the waste material to the inter-liner zone 26. The high resistivity of liner 24 inhibits current flow from inter-liner zone 26 to earth.

When switch 38 from current source 30 is switched so that immersion electrode 34 is in-circuit, and in the absense of a leak in liner 22, the contained material in landfill 10 is exposed to essentially zero field strength. Similarly, when switch 38 from current source 30 is switched to ground electrode 36, and in the absence of a leak in liner 24, inter-liner zone 26 is exposed to essentially zero field strength. In both situations, the voltage difference between measurement electrodes 42a–42n is essentially zero throughout inter-liner zone 26.

Figure 3:
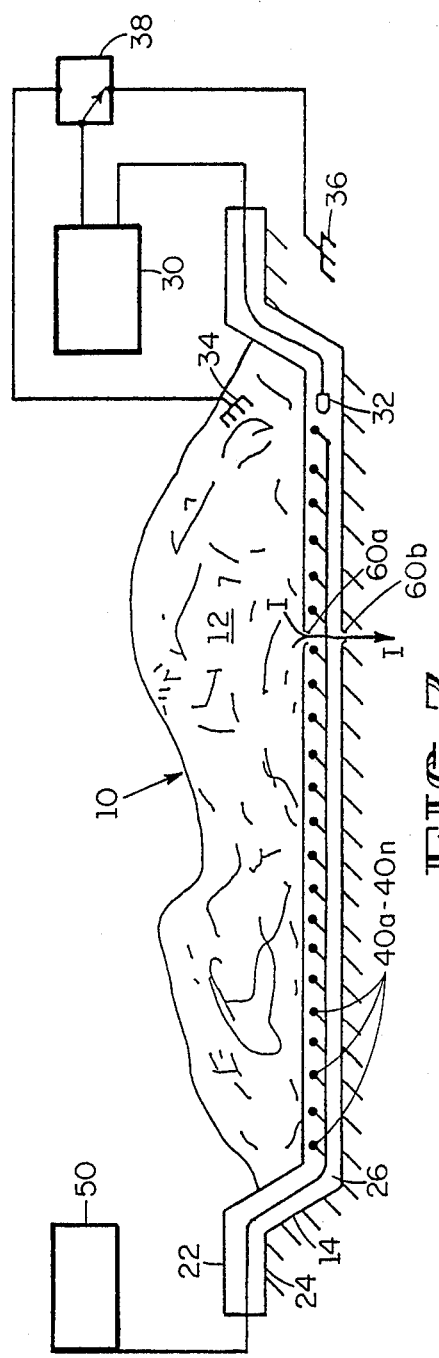
FIG. 3 is a cross sectional view of a landfill having a leak in both liners of the invention.

As shown in FIG. 3, as a result of any number of causes, liner 22 or liner 24 may become punctured, separated at a seam, or otherwise have a leak. Although in FIG. 3, a leak 60 is shown in both liners 22 and 24 near the same location, it is also possible that a leak may occur in only one or the other of liners 22 or 24. It is also possible that a leak might occur in both liners 22 and 24, but at different locations. As will be explained below, various embodiments of this invention permit leaks in either liner to be detected.

FIG. 3 shows the invention with leaks 60a and 60b in both liners 22 and 24 and with switch 38 causing ground electrode 36 to be in-circuit, so that leaks in liner 24 may be located. Leaks 60a and 60b allow liquid to escape from landfill 10 into the earth below liner 24. Because the escaping liquid is conductive, as it passes through leak 60b, an electric current, I, flows through leak 60b. The current flow path is from current source 30, through inter-liner electrode 32, through inter-liner zone 26, through leak 60b, through the earth beneath liner 24, and to ground electrode 36, and thence to the other terminal of current source 30. The flow of liquid through leak 60b establishes a shunt through liner 24, and the resulting electric current, I, forms an electric field in which the current density is greatest at leak 60b.

Alternatively, switch 38 may be operated so that immersion electrode 34 is in-circuit, so that leaks in liner 22 may be located. The current flow path is from current source 30, through immersion electrode 34, through a conductive path in material 12, through leak 60a, through inter-liner zone 26, through inter-liner electrode 32, and thence to the other terminal of current source 30. The flow of liquid through leak 60a establishes a shunt through liner 22 and the resulting current, I, forms an electric field in which the current density is greatest at leak 60a.

Typically, the resistance of liners 22 and 24 will be in the range of $1 \times 10^8$ ohms to $1 \times 10^{14}$ ohms, and the resistance of the material in landfill 10 will be 10 ohms or less. Thus, in the vicinity of a leak, the current density crossing liners 22 or 24 when they have no leaks will be many orders of magnitude less than the current density at a leak.

Figure 4:
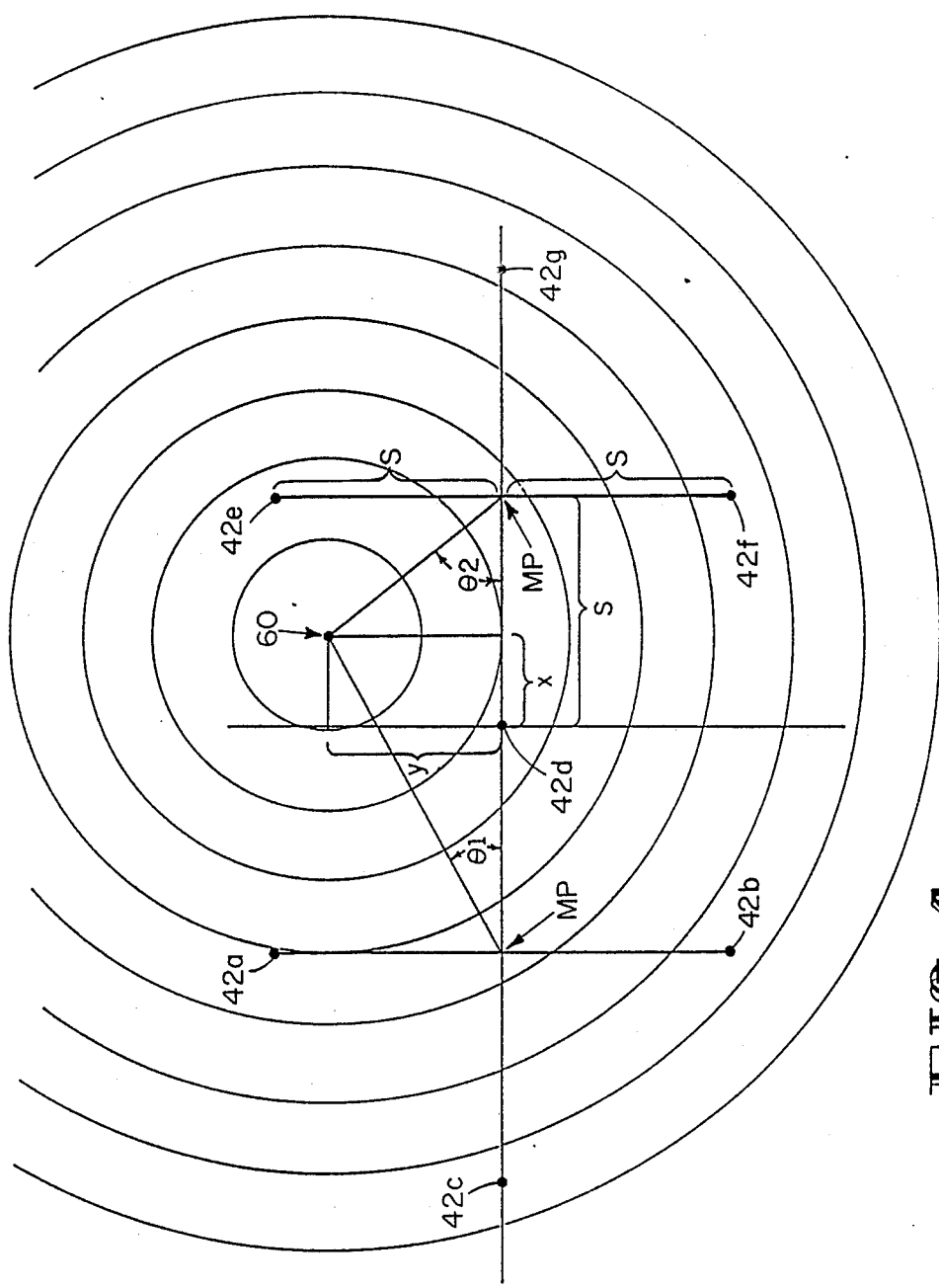
FIG. 4 is an illustration of the method used to locate a leak in a liner using the detector array of FIG. 2.

FIG. 4 is a plan view of a portion of inter-liner zone 26 when there is a leak 60 in either liner 22 or liner 24. When inter-liner electrode 32 is remote from leak 60, the electric field near leak 60 is characterized by concentric circles in a plane perpendicular to the current flow. The current flow induces a voltage of constant value at each concentric circle, i.e. equipotential lines. The equipotential lines will be essentially circular if inter-liner electrode 32 is several times the distance between leak 60 and the electrodes 42a–42n that are proximate to leak 60.

To operate the invention, one of two modes may be selected. The first mode is a leak monitoring mode that detects a leak somewhere in a liner. The second mode is a leak locating mode that locates the leak. It is not necessary to use both modes, and the locating mode can be used to simultaneously locate and detect leaks. Nevertheless, an advantage to first using a monitoring mode is that the monitoring mode tests the entire liner at once for a leak anywhere in it, without the need to scan individual detectors.

In the leak monitoring mode, the inputs from all the electrodes 42a–42n are shorted together and the voltage difference between the shorted electrodes and a reference electrode is monitored. If there are no leaks, no current flows and there is no voltage difference detected by the combination of electrodes. If a leak occurs, electrodes 42a–42n will detect a voltage difference, and the leak can then be located in the manner described below.

The method for locating a leak, as shown in FIG. 4 and as described below, uses well known triangulation techniques. A simple application of such techniques, and that of the preferred embodiment, uses orthogonal measurments obtained at various leak detection points, so that right triangle equations can be used. Other geometric calculations could be substituted that use a known distance between the leak detection points and measurements of electric field at concentric distances from the leak.

In the preferred embodiment of the invention, voltage differences are measured between adjacent orthogonal electrode pairs. The measurement electrodes for locating leak 60 represent two sets of electrodes, each set having two pairs of electrodes, with electrode 42d as a common electrode. One set of electrode pairs consists of electrodes 42a, 42b, 42c, 42d, and the other set consists of electrodes 42d, 42e, 42f, 42g. The midpoint of each set of electrodes is designated as MP in FIG. 4.

The amplitude of the readings from the pairs of electrodes shown in FIG. 4 are four orthogonal measurements: $V_{ab}$, $V_{cd}$, $V_{ef}$, and $V_{dg}$ with $V_{ab}$ representing the voltage between electrodes 42a and 42b, etc. Two location vector angles are calculated as:

$$\tan\text{theta1} = \frac{V_{ab}}{V_{cd}} \tag{1}$$

$$\tan\text{theta2} = \frac{V_{ef}}{V_{dg}} \tag{2}$$

where theta1 and theta2 each represent an angle between a straight line between electrodes 42c and 42g and a leak location vector drawn from the midpoint, MP, of each set of electrode pairs to leak 60.

The above equations are easily understood by imagining that a pair of electrodes, 42c and 42d, is aligned with the leak location vector from MP to leak 60. In this situation, the voltage difference across electrode pair 42c and 42d is maximized and the voltage across electrode pair 42a and 42b is minimized. $V_{ab}/V_{cd}$ would then approach zero, indicating a zero degree angle from the line between electrodes 42c and 42d.

It is also seen from FIG. 4 that values for theta1 and theta2 can be determined geometrically. Thus:

$$\tan\text{theta1} = \frac{y}{S + x} \tag{3}$$

$$\tan\text{theta2} = \frac{y}{S - x} \tag{4}$$

where x and y represent x and y coordinates of leak 60 with respect to an origin at detector 40d. S is one-half the distance between the two electrodes comprising the orthogonal electrode pairs.

By eliminating tan theta1 and tan theta2 from the two sets of equations, a third set of equations is obtained:

$$\frac{V_{ab}}{V_{cd}} = \frac{y}{S + x} \tag{5}$$

$$\frac{V_{ef}}{V_{dg}} = \frac{y}{S - x} \tag{6}$$

which can be solved for x and y. The resulting coordinates of leak 60 are:

$$x = \frac{S(V_{ef}V_{cd} - V_{dg}V_{ab})}{V_{dg}V_{ab} + V_{ef}V_{cd}} \tag{7}$$

$$y = \frac{2S(V_{ab}V_{ef})}{V_{dg}V_{ab} + V_{ef}V_{cd}} \tag{8}$$

Since x and y are now in terms of known and measured values, and the location of detector 40d is known, the location of leak 60 is also known.

The calculations above are valid for locating a leak 60 in either liner of a two-layer liner. The invention is selectively operable, by means of switch 38, to locate leaks in liner 22 or liner 24. For detecting and locating leaks in liner 22, switch 38 is set so that the output of current source 30 is directed to immersion electrode 34. A voltage is impressed between immersion electrode 34 and inter-liner electrode 32.

For detecting and locating leaks in liner 24, the same apparatus is used, although the detection of such leaks will require a current path through the leak, which may be caused by leakage from liner 22, residual moisture in inter-liner zone 26, water injected into inter-liner zone 26, or some other means for facilitating a current path. In this situation, switch 38 is set so that the output of current source 30 is directed to ground 6. A voltage is impressed between inter-liner electrode 32 and ground electrode 36

When the voltage is impressed across the liner under inspection, the method for detecting and locating leaks is the same for both liners. The monitoring mode is used to detect leaks, and for this purpose any number of detector inputs may be combined. A change in the electric or magnetic field results from a current through a leak, which indicates the leak. When a leak is detected, the invention is operated in a location mode, wherein measurements from selected combinations of detectors are made.

The use of detector sets 40a–40n in closest proximity to leak 60 are preferred for best leak location accuracy. The closest proximity detectors will also have the largest aggregate signal readings. The sets of orthogonal electrodes 42a–42g used to geometrically locate a leak using the preferred embodiment are selected to be the electrodes in the geometry shown in FIG. 4, with large measured voltage differences, $V_{ab}$, $V_{cd}$, etc. Equations (7) and (8) are then used to locate the leak.

Although equations (7) and (8) were derived using an example with both x and y positive, the calculated values of x and y may have any combination of positive and negative values. Equations (7) and (8) also apply for leaks 60 that are outside of the quadrants defined by the electrodes 42a–42g if the polarity of the voltage differences is measured and observed. Furthermore, the accuracy and reliability of the invention can be improved by using additional measurements from additional close proximity combinations of sets of orthogonal electrodes.

Although the calculations described above are in terms of measurements of the electric field caused by a leak, it should be understood that the leak results in an electromagnetic field effect that includes both an electric field and a magnetic field. Thus, the above method could be easily adapted to a method that measured the strength of the magnetic field around leak 60 rather than an electric field. Like an electric field, the magnetic field around leak 60 would be comprised of concentric circles of constant values. Thus, detectors 40a–40n would have magnetic field sensors rather than voltage difference measurement means. An advantage of measuring magnetic field with such sensors is that corrosion of electrodes 42a–42n would not be a problem because the sensors could be sealed.

B. Systems having two-layer liners and electrode pairs at each detector

As explained above, the preferred embodiment described above uses a single electrode at each detector 40a–40b. In an alternative embodiment, shown in FIG. 5, detectors 70a–70n each have two electrode pairs, 72a–72n and 74a–74n, which measure the voltage difference from one member of each pair to the other member. As in the preferred embodiment described in part A, two sets of measurements are obtained, each set consisting of two orthogonal voltage measurements.

Figure 5:
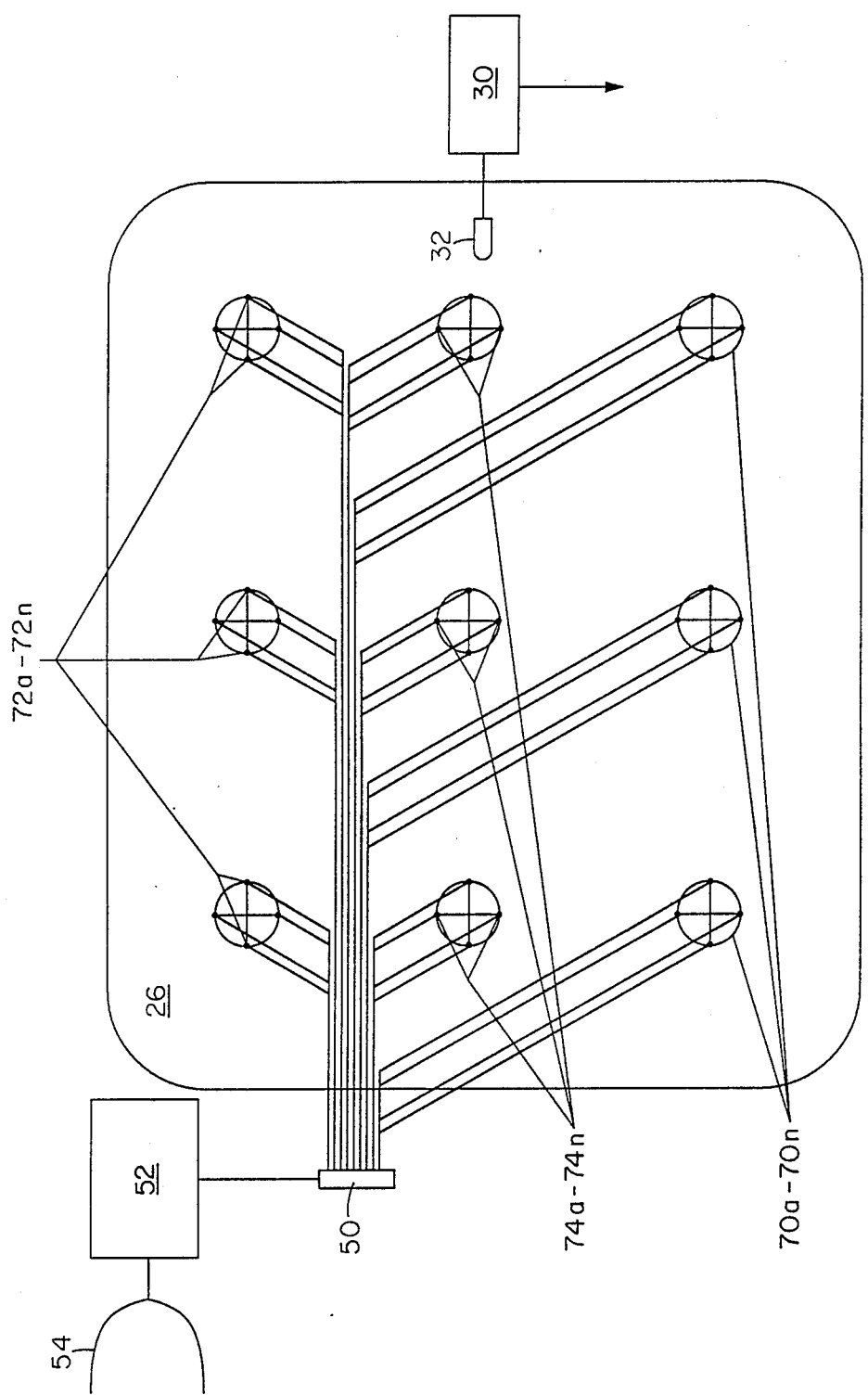
FIG. 5 is a plan view of an alternative embodiment of the detector array of FIG. 2.

In FIG. 5, electrode pairs 72a–72n are x-measurement electrodes and electrode pairs 74a–74n are y-measurement electrodes. At each detector 70a–70n, each electrode pair 72a–72n is located orthogonally to an electrode pair 74a–74n, and each pair is not in electrical contact with the other pair. Electrodes 72a–72n and 74a–74n are protected from corrosion, such as by cathodic protection.

Figure 6:
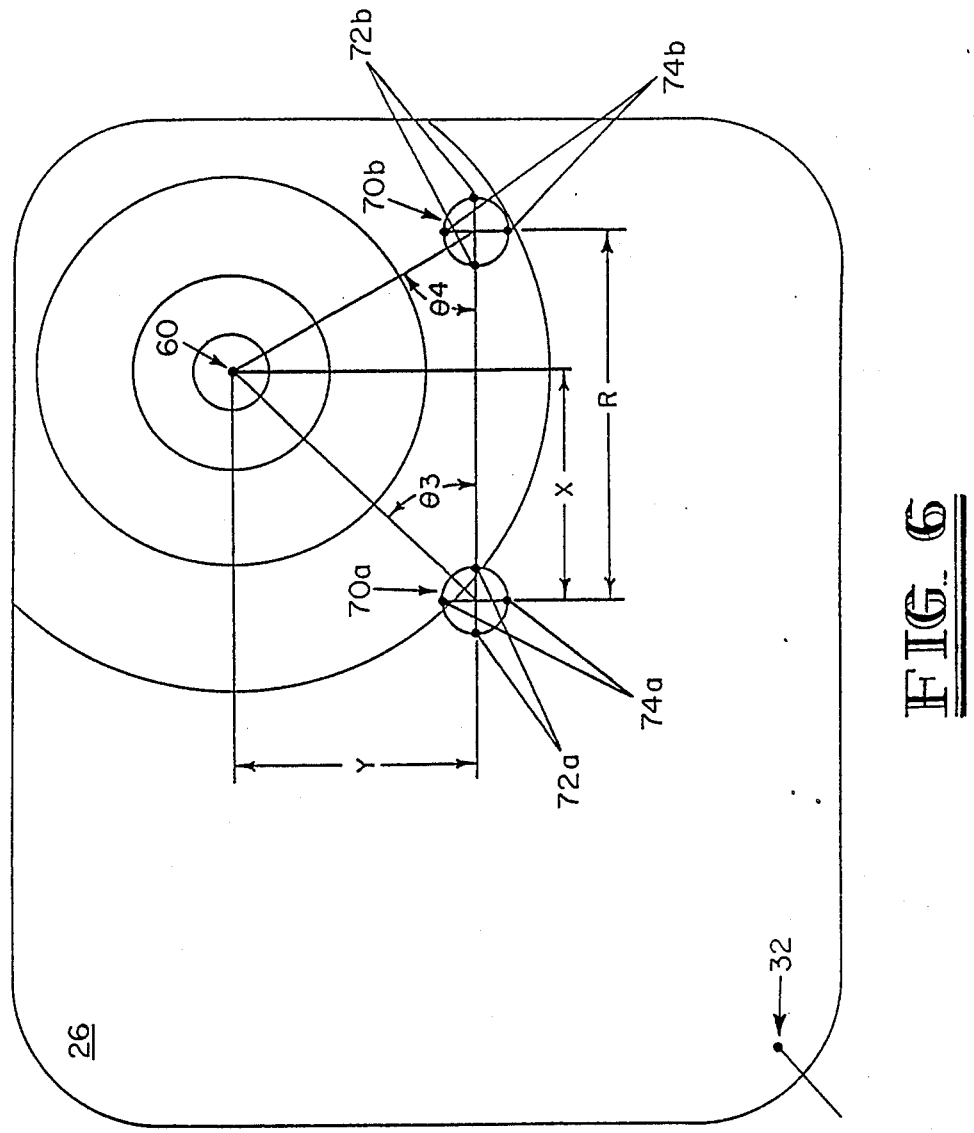
FIG. 6 is an illustration of the method used to locate a leak in a liner using the detector array of FIG. 5.

This embodiment uses orthogonal measurements obtained using two detectors, four pairs of electrodes, and no common electrodes. As illustrated in FIG. 6, potential measurements at two detectors 70a and 70b are used to calculate the location of leak 60. The amplitude of the readings from the four pairs of electrodes shown in FIG. 6 are $V_{72a}$, $V_{74a}$, $V_{72b}$, and $V_{74b}$, with $V_{72a}$ representing the voltage difference across the opposing electrodes of electrode pair 72a, etc. Two vector angles are calculated as:

$$\tan\theta 3 = \frac{V_{74a}}{V_{72a}} \quad (9)$$

$$\tan\theta 4 = \frac{V_{74b}}{V_{72b}} \quad (10)$$

where theta3 and theta4 each represent an angle between R, which is a staight line between detectors 70a and 70b, and a leak location vector, originating at detector 70a or 70b and extending to the leak.

It is also seen from FIG. 6 that values for theta3 and theta4 can be determined geometrically. Thus:

$$\tan\theta 3 = \frac{y}{x} \quad (11)$$

$$\tan\theta 4 = \frac{y}{R - x} \quad (12)$$

where x and y represent x and y coordinates of leak 60 with respect to an origin at detector 70a.

By eliminating tan theta3 and tan theta4 from the two sets of equations, a third set of equations is obtained.

$$\frac{V_{74a}}{V_{72a}} = \frac{y}{x} \quad (13)$$

$$\frac{V_{74b}}{V_{72b}} = \frac{y}{R - x} \quad (14)$$

which can be solved for x and y. The resulting coordinates of leak 60 are:

$$x = \frac{V_{72a}V_{74b}R}{V_{72b}V_{74a} + V_{72a}V_{74b}} \quad (15)$$

$$y = \frac{V_{74a}V_{74b}R}{V_{72b}V_{74a} + V_{72a}V_{74b}} \quad (16)$$

Because x and y are now in terms of known and measured values, the location of detector 40a is known, the location of leak 60 is also known.

For locating leaks in liner 22, at least two detectors 70a and 70b are installed in inter-liner zone 26 at known fixed positions. The distance, R, between detectors 70a and 70b is known. Detectors 70a and 70b are in electrical communication with terminal 50, which may be accomplished with wires 56. Switch 38 is set so that the output of current source 30 is directed to immersion electrode 34. A voltage is impressed between immersion electrode 34 and inter-liner electrode 32. The voltage measurements from detectors 70a and 70b are monitored at terminal 50 for a change in potential between any two pairs of electrodes: 72a, 74a, 72b, or 74b. If a change in potential is detected, the potentials at all electrodes are measured. These measurements, $V_{72a}$, $V_{74a}$, $V_{72b}$, and $V_{74b}$, are used to calculate the location of the leak, as explained above, using equations (15)–(16).

For locating leaks in liner 24, the same apparatus is used, but switch 38 is set so that the output of current source 30 is directed to ground electrode 36. A voltage is impressed between inter-liner electrode 32 and ground electrode 36. The voltage measurements from detectors 70a and 70b are monitored at terminal 50 for a change in potential between any two of electrodes pairs 72a, 74a, 72b, and 74b. If a change in potential is detected, the potentials of the electrodes are measured.

These measurements, $V_{72a}$, $V_{74a}$, $V_{72b}$, and $V_{74b}$ are used to calculate the location of the leak in liner 24, as explained above, using equations (15) and (16).

The use of detector sets 70a–70n in closest proximity to the leak are preferred for best leak location accuracy. The closest proximity detectors will also have the largest aggregate signal readings. The sets of orthogonal electrodes 72a, 74a, 72b, and 74b used to geometrically locate a leak are selected to be the electrodes in the geometry shown in FIG. 6 with large measured voltage differences. Equations (15) and (16) are then used to locate the leak.

Although equations (15) and (16) were derived using an example with both x and y positive, the calculated values of x and y may have any combination of positive and negative values. Equations (15) and (16) also apply for leaks 60 that are outside of the quadrants defined by the electrodes 72a, 74a, 72b and 74b if the polarity of the voltage differences is measured and observed. Furthermore, the accuracy and reliability of the invention can be improved by using additional measurements from additional close proximity combinations of sets of orthogonal electrodes.

In an alternative embodiment of detectors 70a–70n, each detector has only three electrodes. Detectors 70a–70n are each be comprised of a common electrode at an apex and two additional electrodes spaced at ninety degrees. Thus, each detector is comprised of three electrodes, which form a right angle. Two orthogonal voltage differences are measured at each detector, by using the common electrode for both measurements. A location method similar to that described in equations (9)–(16) is used to locate leaks.

C. Systems having two-layer liners with detectors in landfill or in earth; systems having one-layer liners In an alternative embodiment, leaks in liner 22, which may or may not have a bottom liner 24, could be located by placing detectors 40a–40n above liner 22 in landfill 10. In another alternative embodiment, leaks in liner 24, which may or may not have a top liner 22, could be located by placing detectors 40a–40n below liner 24 in the earth. If detectors 40a–40n are located in landfill 10 or in the earth under landfill 10, the invention would then be used in the same way described above to monitor for changes in voltages at detectors 40a–40n, measure voltages, and located leaks.

A disadvantage of this embodiment as compared to the preferred embodiment, which locates detectors 40a–40n in inter-liner zone 26, is that the two-dimensional environment of inter-liner zone 26 enhances the accuracy of the measurements. Nevertheless, this loss of accuracy can be overcome to a large extent by placing the detectors closer together.

D. Other embodiments

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

I claim:

1. An apparatus for detecting and locating a leak in a landfill containing an electrically conductive liquid-solid mixture of material and having an electrically resistive liner with a lower surface that is in contact with a material that is also electrically conductive, comprising:

a means for impressing a voltage difference across said liner such that an electrical current is caused to flow through said leak, and such that an electromagnetic field is created in the vicinity of said leak; and at least two detector means for obtaining a total of at least four gradient measurements of said electromagnetic field, each of said measurements being between a first point and a second point in the vicinity of said leak, and each of said measurements being orthogonal to one other of said measurements, said detector means being in fixed and known locations generally parallel and immediately adjacent to said liner.

2. The apparatus of claim 1, wherein said means for impressing a voltage difference has a first output electrically connected to said conductive material in said landfill and a second output electrically connected to said conductive material below said liner.

3. The apparatus of claim 1, wherein said detector means comprises voltage measuring means for measuring the electric field.

4. The apparatus of claim 1, wherein said detector means comprises magnetic field measuring means.

5. The apparatus of claim 1, wherein said detector means are each comprised of a single means for measuring a single point in said field and there are at least seven of said detector means.

6. The apparatus of claim 1, wherein said detector means are each comprised of two pairs of orthogonally spaced measuring means for measuring four points in said field and thereby obtaining two of said gradient measurements.

7. The apparatus of claim 1, wherein said detector means are each comprised of three measuring means, configured to form a right triangle, such that one of said measuring means may be used as a common measuring means for measuring three points in said field and thereby obtaining two of said gradient measurements.

8. An apparatus for detecting and locating a leak in a landfill containing an electrically conductive liquid-solid mixture of material and having a top and a bottom liner that are both electrically resistive, wherein said bottom liner has a lower surface that is in contact with a material that is also electrically conductive, comprising:

a conductive inter-liner zone between said top and said bottom liners;

a means for selectively impressing a voltage difference across said liners such that an electrical current is caused to flow through said leak: and at least two detector means for obtaining a total of at least four gradient measurements of said electromagnetic field, each of said measurements being between a first point and a second point in the vicinity of said leak, and each of said measurements being orthogonal to one other of said measurements, said detector means being in fixed and known locations generally parallel and immediately adjacent to said liner.

9. The apparatus of claim 8, wherein said means for impressing a voltage difference has a first output electrically connected to said conductive material in said landfill and a second output electrically connected to said conductive material below at least one of said liners.

10. The apparatus of claim 8, wherein said means for impressing a voltage is switchable such that voltage may be impressed across either said top liner or said bottom liner.

11. The apparatus of claim 8, wherein said detector means comprises voltage measuring means for measuring the electric field.

12. The apparatus of claim 8, wherein said detector means comprises magnetic field measuring means.

13. The apparatus of claim 8, wherein said detector means are each comprised of a single means for measuring a single point in said field and there are at least seven of said detector means.

14. The apparatus of claim 8, wherein said detector means are each comprised of two pairs of orthogonally spaced measuring means for measuring four points in said field and thereby obtaining two of said gradient measurements.

15. The apparatus of claim 8, wherein said detector means are each comprised of three measuring means, configured to form a right triangle, such that one of said measuring means may be used as a common measuring means for measuring three points in said field and thereby obtaining two of said gradient measurements.

16. A method for detecting and locating a leak in a landfill containing an electrically conductive liquid-solid mixture of material and having an electrically resistive liner with a lower surface that is in contact with a material that is also electrically conductive, comprising the steps of:
   placing at least two detector means for measuring an electromagnetic field in the vicinity of said leak, said detector means being in fixed and known locations generally parallel and immediately adjacent to said liner:
   impressing a voltage difference across said liner, such that an electrical current is caused to flow through said leak, and such that an electromagnetic field is created in the vicinity of said leak:
   obtaining a total of at least four gradient measurements of said electromagnetic field, each of said measurements being between a first point and a second point in the vicinity of said leak, and each of said measurements being orthogonal to one other of said measurements: and
   calculating the location of said leak by means of geometric equations, wherein said equations are functions of said electromagnetic field strength as determined by said gradient measurements.

17. The method claimed in claim 16, wherein said impressing voltage difference further comprises electrically connecting a first output of a power supply to said conductive material in said landfill and electrically connecting a second output of a power supply to said conductive material in contact with a lower surface of said liner.

18. The method claimed in claim 16, wherein said step of obtaining gradient measurements of said electromagnetic field comprises measuring voltage differences.

19. The method claimed in claim 16, wherein said step of obtaining gradient measurements of said electromagnetic field comprises measuring magnetic differences.

20. The method claimed in claim 16, wherein said four gradient measurements are obtained from detector means each comprised of a single means for measuring a single point in said field and there are at least seven of said detector means.

21. The method claimed in claim 16, wherein said four gradient measurements are obtained from detector means each comprised of two pairs of orthogonally spaced measuring means for measuring four points in said field and thereby obtaining two of said gradient measurements.

22. The method claimed in claim 16, wherein said four gradient measurements are obtained from detector means each comprised of three measuring means, configured to form a right triangle, such that one of said measuring means may be used as a common measuring means for measuring three points in said field and thereby obtaining two of said gradient measurements.

23. The method claimed in claim 16 further comprising the step of monitoring for leaks by means of detecting any difference in the electromagnetic field in an area generally parallel with said liner.

24. A method for detecting and locating a leak in a landfill containing an electrically conductive liquid-solid mixture of material and having a top and a bottom liner that are both electrically resistive, wherein said bottom liner has a lower surface that is in contact with a material that is also electrically conductive, comprising the steps of:
   placing a conductive inter-liner zone between said top and said bottom liners:
   placing at least two detector means for measuring an electromagnetic field in the vicinity of said leak, said detector means being in fixed and known locations generally parallel and immediately adjacent to said liner:
   impressing a voltage difference across said liners, such that an electrical current is caused to flow through said leak, and such that an electromagnetic field is created in the vicinity of said leak:
   obtaining a total of at least four gradient measurements of said electromagnetic field, each of said measurements being between a first point and a second point in the vicinity of said leak, and each of said measurements being orthogonal to one other of said measurements: and
   calculating the location of said leak by means of geometric equations, wherein said equations are functions of said electromagnetic field strength as determined by said gradient measurements.

25. The method claimed in claim 24, wherein said step of impressing a voltage difference across said liners further comprises electrically connecting a first output of a power supply to said conductive material in said landfill and electrically connecting a second output of a power supply to at least one of said conductive materials in contact with said liners.

26. The method claimed in claim 24, wherein said step of impressing a voltage across said liners comprises electronically switching a power supply such that said voltage is selectively impressed across one of said liners.

27. The method claimed in claim 24, wherein said step of obtaining gradient measurements of said electromagnetic field comprises measuring voltage differences.

28. The method claimed in claim 24, wherein said step of obtaining gradient measurements of said electromagnetic field comprises measuring magnetic differences.

29. The method claimed in claim 24, wherein said four gradient measurements are obtained from detector means each comprised of a single means for measuring a single point in said field and there are at least seven of said detector means.

30. The method claimed in claim 24, wherein said four gradient measurements are obtained from detector means each comprised of two pairs of orthogonally spaced measuring means for measuring four points in said field and thereby obtaining two of said gradient measurements.

31. The method claimed in claim 24, wherein said four gradient measurements are obtained from detector means each comprised of three measuring means, configured to form a right triangle, such that one of said measuring means may be used as a common measuring means for measuring three points in said field and thereby obtaining two of said gradient measurements.

32. The method claimed in claim 24 further comprising the step of monitoring for leaks by means of detecting any difference in the electromagnetic field in an area generally parallel with said liner.

* * * * *

UNITED STATES PATENT AND TRADEMARK OFFICE
CERTIFICATE OF CORRECTION

PATENT NO. : 4,947,470
DATED : August 7, 1990
INVENTOR(S) : Glenn T. Darilek

It is certified that error appears in the above—identified patent and that said Letters Patent is hereby corrected as shown below:

Column 1, line 18, the word "membrance" should be --membrane--.
Column 1, line 19, the word "membrance" should be --membrane--.
Column 1, line 22, the word "membrance" should be --membrane--.
Column 2, line 3, the words "a electrical" should be --an electrical--.
Column 4, line 41, the comma following "leachate saturated" should be deleted.
Column 9, line 22, the word "measurments" should be --measurements"--.

In the drawing, sheet 4, Fig. 5, the reference numeral 56 should be applied to the group of wires leading from terminal 50 into the array of detectors 70a - 70n, as identified in column 10, line 49.

Signed and Sealed this

Thirty-first Day of March, 1992

Attest:

HARRY F. MANBECK, JR.

Attesting Officer

Commissioner of Patents and Trademarks